United States Patent
Froment et al.

(10) Patent No.: US 11,099,415 B2
(45) Date of Patent: Aug. 24, 2021

(54) SUPPORT PART FOR A COMPONENT OF A SECURED ELECTRONIC DEVICE

(71) Applicant: INGENICO GROUP, Paris (FR)

(72) Inventors: Marion Froment, Loriol (FR); Philippe Dedieu, Guilherand-Granges (FR)

(*) Notice: Subject to any disclaimer, the term of this patent is extended or adjusted under 35 U.S.C. 154(b) by 112 days.

(21) Appl. No.: 16/335,411

(22) PCT Filed: Sep. 22, 2017

(86) PCT No.: PCT/EP2017/073999
§ 371 (c)(1),
(2) Date: Mar. 21, 2019

(87) PCT Pub. No.: WO2018/055076
PCT Pub. Date: Mar. 29, 2018

(65) Prior Publication Data
US 2020/0026115 A1    Jan. 23, 2020

(30) Foreign Application Priority Data
Sep. 22, 2016 (FR) ...................... 1658925

(51) Int. Cl.
*G02F 1/1333* (2006.01)
*G06Q 20/12* (2012.01)
*H05K 1/14* (2006.01)

(52) U.S. Cl.
CPC ....... *G02F 1/133308* (2013.01); *G06Q 20/12* (2013.01); *H05K 1/142* (2013.01); *G02F 1/133302* (2021.01); *G02F 1/133325* (2021.01); *G02F 1/133354* (2021.01); *H05K 2201/10204* (2013.01)

(58) Field of Classification Search
None
See application file for complete search history.

(56) References Cited

U.S. PATENT DOCUMENTS

2013/0271699 A1* 10/2013 Chen .................... G02B 6/0031
349/62

FOREIGN PATENT DOCUMENTS

| EP | 1346384 B1 | 12/2016 |
|---|---|---|
| WO | 0057262 A1 | 9/2000 |

OTHER PUBLICATIONS

International Search Report and Written Opinion dated Dec. 11, 2017 for corresponding International Application No. PCT/EP2017/073999, filed Sep. 22, 2017.
English translation of the Written Opinion of the International Searching Authority dated Dec. 19, 2017 for corresponding International Application No. PCT/EP2017/073999, filed Sep. 22, 2017.

* cited by examiner

*Primary Examiner* — Thanh Nhan P Nguyen
(74) *Attorney, Agent, or Firm* — David D. Brush; Westman, Champlin & Koehler, P.A.

(57) ABSTRACT

A support part for an LCD display module of an electronic device includes at least one element for receiving a press device for pressing a dummy key. The support part at least one attachment element for securing the part to a printed circuit board of the electronic device such that the press device is compressed between the support part and the printed circuit board.

14 Claims, 3 Drawing Sheets

SUPPORT PART FOR A COMPONENT OF A SECURED ELECTRONIC DEVICE

CROSS-REFERENCE TO RELATED APPLICATIONS

This Application is a Section 371 National Stage Application of International Application No. PCT/EP2017/073999, filed Sep. 22, 2017, which is incorporated by reference in its entirety and published as WO 2018/055076 A1 on Mar. 29, 2018, not in English.

1. FIELD OF THE INVENTION

The present technique relates to the field of electronic devices that require securing functions. The proposed technique relates more particularly to support parts that can be used in a securing system that implements a securing technique known as the "dummy key" approach. The proposed technique applies in particular to data-entry devices such as payment terminals.

2. PRIOR ART

For entry devices such as payment terminals, it is necessary to safeguard against attempts at fraud, disassembly etc. Hence, protective measures are used. These protection measures comprise hardware protection measures and software protection measures. Hardware protection measures include especially techniques intended to detect the dismantling of the device or of a device component.

There are known "dummy key" techniques used to enhance security and ascertain that the device or a component of the device does not undergo any attempt at dismantling. As illustrated with reference to FIG. 1, the electronic device 1 comprises a PCB (printed-circuit board) 10, a support part 13 for supporting a component 14, a casing 11 and a pressing device 12. The component 14, the support part 13, the pressing device 12 and the PCB 10 are assembled in a limited space in the casing 11. The pressing device 12 is compressed between the support part 13 and the PCB 10 so that it exerts a force FD on a dummy key 101 of the PCB 10. The force FD exerted must be sufficient to activate the dummy key 101. When the casing is dismantled or when the component is removed, the pressing device gets decompressed and the force exerted on the dummy key 101 diminishes or even disappears. The pressure exerted on the dummy key 101 is therefore lower (or it has disappeared) and the intrusion can thus be detected (because there is no longer any current passing through the electrical circuit formed in the dummy key).

The prior-art solution described here above however has drawbacks. Indeed, when the pressing device 12 is compressed, it also exerts a force on the support part 13 at a contact area 130. This force at the contact area gives rise to a variable deformation or change in the shape of the support part. The deformation is generally greater for compact electronic devices that have fine support parts. A force is exerted for example on a component situated above the deformed contact area by the support part. The pressure exerted on this component above the contact area can lead to a deformation of this component, leading to a deterioration of the performance of the component or even a breakage of this component. For example, when the component in question is an LCD display module, the quality of display of the display module can be impaired. If the deformation is great, the LCD display module too can be irreparably damaged. More generally, even if there is no component above the contact area, it can happen that this deformed contact area is situated directly on the external casing of the device, leading to two other problems due to the deformation of the external casing: on the one hand, a diminishing of the aesthetic quality of the product and on the other hand the furnishing of clues about the position of the dummy keys (the fraudster, by observing the deformation, can know where the dummy keys are situated and can therefore adapt the dismantling of the device accordingly).

It therefore necessary to resolve the problem of deformation (especially the deformation of a component of a secured electronic device) while at the same time applying the "dummy key" technique to counter attempts at dismantling.

3. SUMMARY OF THE INVENTION

The proposed technique does not have the problems of the prior art. More particularly, the proposed technique relates to a support part of a component of an electronic device. A support part is proposed for supporting a component of an electronic device comprising at least one receiving element for receiving a pressing device for pressing on a dummy key, said part being characterized in that it comprises at least one attaching element to secure said part to a PCB of the electronic device such that the pressing device is compressed between said support part and said PCB.

Thus, the attaching element can generate a holding force that compensates at least partly for the force exerted on the support part by the pressing device. The force between the module and the support part is reduced. The deformation of the component is thus mitigated or eliminated.

According to one particular characteristic, said receiving element is a cylinder capable of receiving a portion of said pressing device.

The cylinder is used as a housing of the pressing device. The pressing device can thus be maintained in a stable manner within the cylinder.

According to one particular characteristic, said attaching element takes the form of a toe.

Thus, the support part can be attached to a PCB in a simple and stable manner.

The technique also relates to a system for securing an electronic device comprising a support part for supporting a component and a PCB comprising at least one dummy key, said support part comprising at least one receiving element for receiving a pressing device for pressing on said dummy key, said system being characterized in that said support part comprises an attaching element configured to secure said support part to the PCB so that the pressing device is compressed between said support part and said PCB.

This secured protection system enables the detection of attempts to dismantle the electronic device while preventing the deformation of the support part and of the component supported by the support part.

According to one particular characteristic, said receiving element is a cylinder, a portion of the pressing device being inserted into said cylinder.

According to one particular characteristic, said attaching element takes the form of a toe.

According to one particular characteristic, the securing system comprises a holding element soldered to said PCB, said toe being inserted into a notch disposed in said holding element.

According to one particular embodiment, said holding element forms part of an electromagnetic shielding element fixedly attached to said PCB.

Thus, the securing system uses the shielding element existing in an electronic device to attach a support part to the PCB. It is no longer necessary to have an element specifically dedicated to this purpose.

The technique also relates to an electronic device comprising a securing system as presented here above.

Thus, any type of electronic device can implement the securing system to detect attempts to dismantle the device.

According to one particular embodiment, an attaching element attached to the PCB generates a force FM that holds said support part attached to said PCB, said pressing device exerting a force FD on the dummy key of the PCB and a force FD' on the support part, said component exerting a force FC on said support part, the force FD being sufficient to activate the dummy key.

According to one particular characteristic, the value of the force FM is equal to the value of the force FD'.

Thus, the force FM compensates for the totality of the force FD'. The securing system works independently of the component supported by the support part. Attempts to dismantle the support part can be detected by the electronic device.

According to one particular embodiment, the value of the force FD' is equal to the value of the sum of the force FM and the force FC, the value of the force FC being greater than zero.

Thus, the force FM compensates only for a part of the force FD'. The force FC compensates for the remaining part of the force FD'. When a hacker tries to dismantle the module supported by the support part, the force FC diminishes. This leads to a diminishing of the force FD. The dummy key is deactivated because the force FD is insufficient to maintain pressure on this dummy key. The dismantling attempt is thus detected.

According to one particular embodiment, said component is an LCD display module.

Thus, the quality of display of the LCD display module is maintained while implementing the dummy key technique to detect an attempt to dismantle said display module.

According to one particular characteristic, the electronic device comprises a casing, said display module being disposed between the upper part of said casing and the support part.

Thus, the LCD display module is held between the upper part of the casing and the support part of the module. The dismantling of the upper part of the electronic device can thus be detected by the securing system.

According to one particular embodiment, said electronic device is a payment terminal.

Thus, the securing system of the proposed technique improves the security of a payment terminal that is very sensitive to intrusions by dismantling.

4. FIGURES

Other characteristics and advantages shall appear more clearly from the following description of a particular embodiment of the disclosure, given by way of a simple illustratory and non-exhaustive example, and from the appended drawings, of which:

5. DETAILED DESCRIPTION

As explained here above, it is necessary to have available a securing system which, while providing a level of security identical to that of the prior art, also makes it possible no to exert any pressure on the components that might be situated above the dummy keys.

Thus, in order to resolve the problem relating to the deformation of a component of an identical device of the prior art, the inventors have designed a novel support part of a component to lessen and/or eliminate the deformation of the support part caused by the compression of a pressing device. The deformation of the component supported by the support part is therefore at least lessened or even eliminated. The novel support part, the pressing device and the PCB constitute a securing system according to the proposed technique. One embodiment of an electronic device implementing the securing system according to the proposed technique is presented with reference to FIGS. 2 and 3.

The general principle of the proposed technique consists of the creation of a support part comprising one or more attaching elements. The attaching element can be attached to a PCB to compensate for at least a part of the force exerted by the pressing device on the support part at the receiving element of the pressing device. The deformation of the support part can thus be lessened and/or eliminated. The deformation of the component supported by the support part is therefore lessened and/or eliminated. For example, when the component is an LCD display device, the quality of display of this LCD display module is thus improved.

Figure 1:
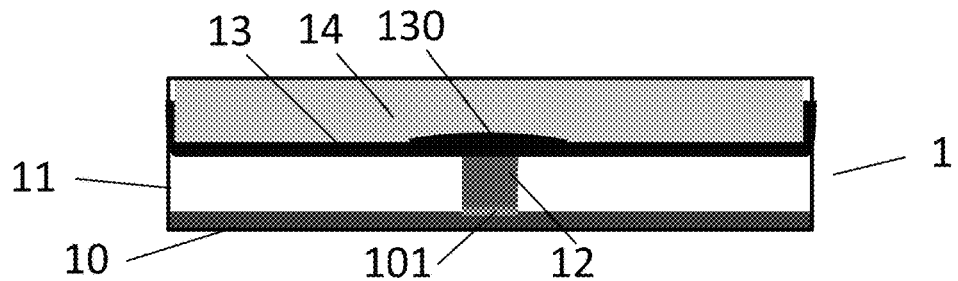
FIG. 1 illustrates an electronic device of the prior art implementing the technique of a "dummy key" on a support part of a component.
Figure 2:
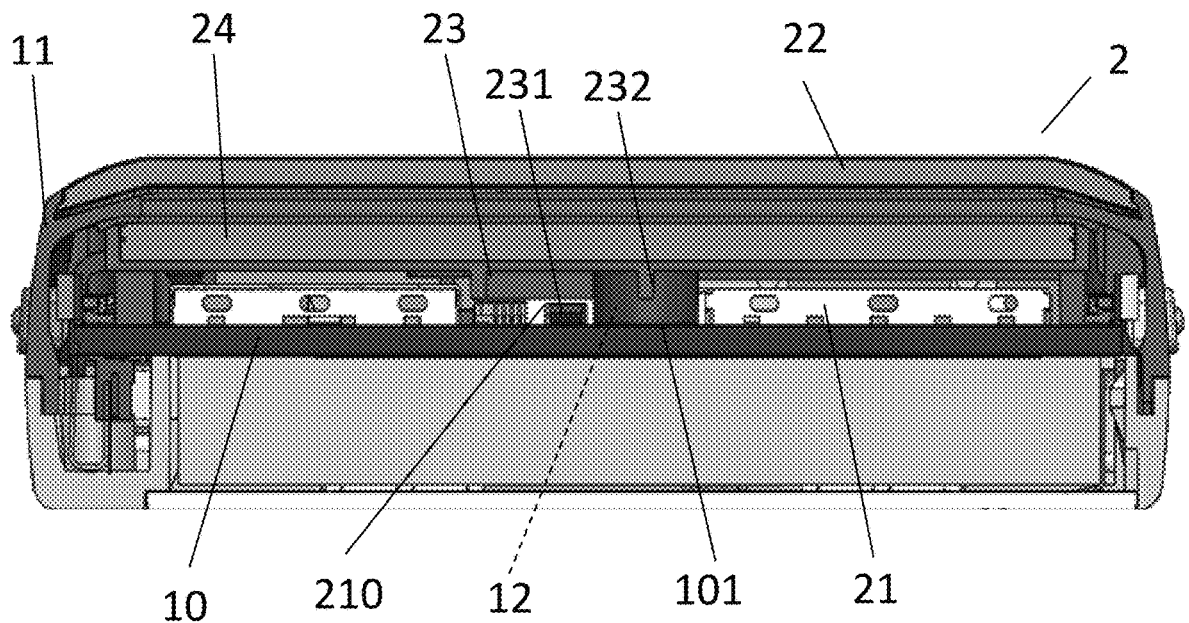
FIG. 2 illustrates a view in section of an electronic device of the proposed technique.

FIG. 2 is a view in section of an electronic device implementing the proposed technique according to one embodiment. This electronic device 2 (such as a payment terminal) comprises a casing 11, a PCB 10, a support part 23 for supporting an LCD display module 24, and electromagnetic shielding element 21 soldered to the PCB 10 and a glass 22 protecting the LCD display module 24. The support part 23 comprises a receiving element 232 for receiving a pressing device 12 and an attaching element in the form of a toe 231. The receiving element 232 is cylindrical. The pressing device 12 is inserted within the cylinder and cannot be seen in FIG. 2. The pressing device can be a puck. A puck is a cylinder made of flexible material that is deformable and generally electrically conductive which makes it possible, on a printed-circuit board, to put an external ring and an internal ring (dummy key) into contact. When sufficient pressure is exerted on the puck, the electrical current passes between the internal ring and the external ring of the dummy key. When the current passes correctly into this dummy key, the device diagnoses itself as being in a state of effective operation. It can also happen that the material is not electrically conductive, in which case a metallic dome is attached to the puck in order to fulfill the function of conducting current across the external ring and the internal ring of the dummy key. In this embodiment, the toe 231 is held in a notch 210 disposed in the electromagnetic shielding element 21 (in other embodiments, the notch can be disposed in another element). In this embodiment, the toe 231 and the pressing cylinder 232 are close to each other in order to create a synergistic effect of distributing force from one element to the other. More particularly, the toe 231 and the pressing cylinder 232 are separated on the support by a distance of 1 mm to 10 mm.

A downward force FM is exerted on the toe 231 to compensate for at least a part of the upward force FD' exerted by the pressing device 12. The deformation of the support part 23 and of the LCD display module 24 is thus lessened or eliminated. In this embodiment, the shielding element 21 fulfils two distinct functions: a first function in which the signals transmitted to the PCB (i.e. the signals transmitted between the components situated within the volume protected by the shielding) are protected; and a second function in which it serves as an element for holding the toe 31 of the support part 23. This makes it possible, in this embodiment, to make sure that an attempt to dismantle the support part, at the toe 231 and/or the notch 210, would lead to a deterioration of the shielding element 21 (by deformation or cutting). Now, the shielding element 21 also comprises anti-intrusion protection elements such as printed-circuit-board lattices or screens. Such circuits enable the detection of any attempt at intrusion and/or dismantling. Thus, given this particular configuration, the holding function (and therefore the transfer of forces) and the protection function are closely linked. This means that the combination of these two functions within a same part plays a role in increasing the security of the entire device in addition to resolving the initial problem.

According to another embodiment, a holding element fulfilling solely the toe 231 with the holding function can be soldered to the PCB 10.

Figure 3:
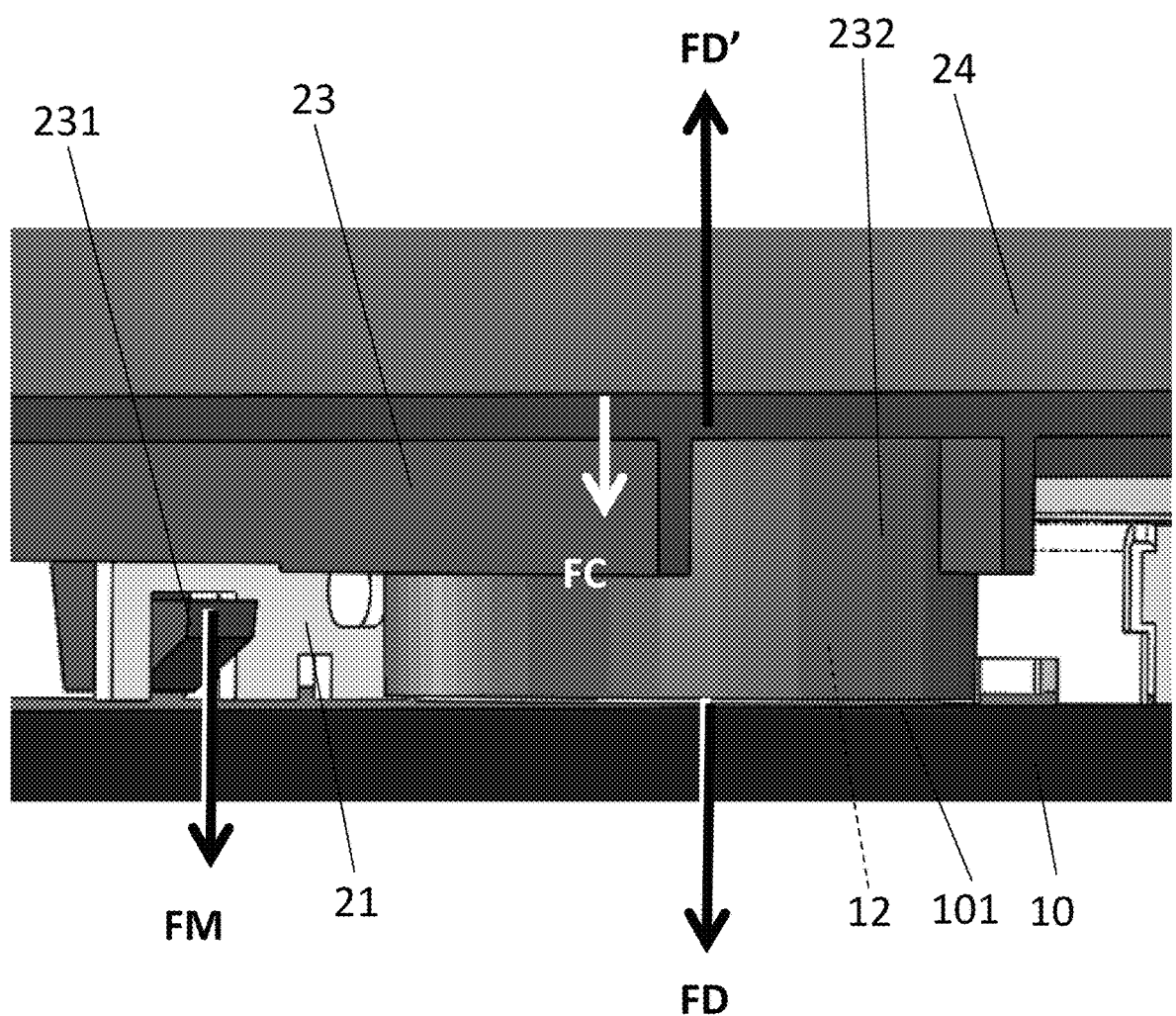
FIG. 3 is a magnified view of a securing system in an electronic device of the proposed technique.

The PCB 10 (comprising a dummy key 101), the electromagnetic shielding element 21 and the support part 23 receiving a pressing device 12 constitute a securing system illustrated with reference to FIG. 3 and FIG. 4. FIG. 3 thus illustrates the forces exerted between the components of the securing system. More specifically, the force FM is the force exerted on the toe 231 of the support part 23 by the holding element (the shielding element 21). The force FC is the force exerted on the support part 23 by the component (the LCD display module 24). The force FD is the force exerted on the dummy key 101 by the pressing device 12. The force FD' is the force exerted on the support part 23 by the pressing device 12. It is understood that the value of the force FD is equal to the value of the force FD' and that it is sufficient to activate the dummy key 101. In the prior-art electronic device, the force FD compensates for the totality of the force FD'. A great force FC thus causes a major deformation of the LCD display module 24. According to the proposed technique, the support part 23 comprises an attaching element (toe 231) enabling the generation of a force FM to compensate for a part or for the totality of the force FD'. The force FC is thus reduced and the deformation of the LCD display module 24 is lessened or eliminated.

Should the force FM compensate for only a part of the force FD', the value of the force FC is greater than zero. We obtain the following equation:

$$|FD'|=|FD|=|FM|+|FC| \qquad (1)$$

One of purposes of securing the toe in the notch is to make it unnecessary to apply excessive force to the periphery of the screen (far from the puck) to preserve an efficient detection of the opening of the product. When a hacker tries to remove the LCD display module 24, the LCD display module 24 can no longer maintain the force FC in a stable way on the support part. The forces exerted on the support part are no longer balanced. The force FD' which is greater than the force FM will lead to an upward deformation of the support part. The pressing device gets decompressed and the forces FD and FD' diminish. The value of the (diminished) force FD is no longer sufficient to induce the activation of the dummy key: the attempt to dismantle the device can thus be detected.

Should the force FM compensate for the totality of the force FD', the value of the force FC is greater than zero. We obtain the following equation:

$$|FD'|=|FD|=|FM| \qquad (2)$$

Indeed, the force FC is equal to zero (here, we overlook the gravitational weight of the LCD display module 24). Therefore, when a hacker removes only the LCD display module 24, the force FD remains unchanged and the dummy key 101 remains active. However, when the hacker continues to remove the support part 23, the pressing device 10 gets decompressed and the force FD diminishes. The dummy key 101 therefore becomes deactivated and the attempt to dismantle the support part can thus be detected.

Figure 4:
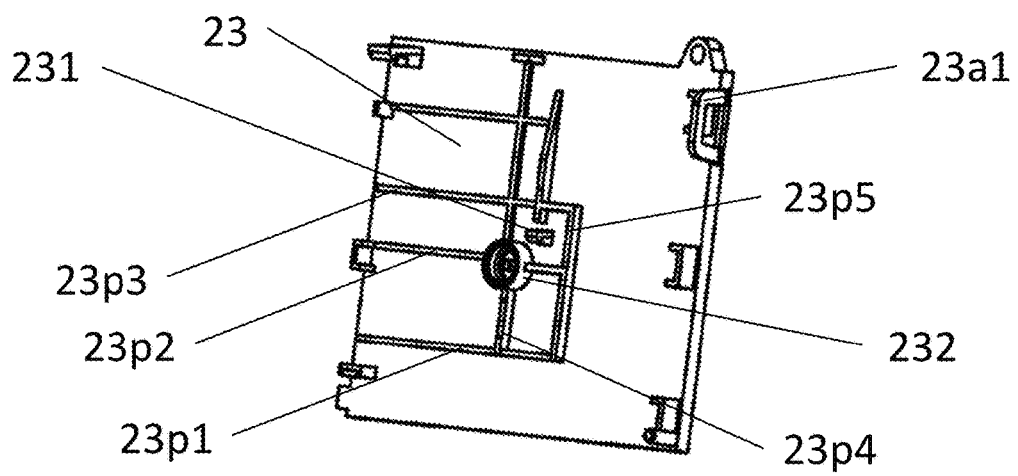
FIG. 4 is an isometric view of the rear face of the support part comprising the reception cylinder and the toe according to one embodiment.
Figure 5:
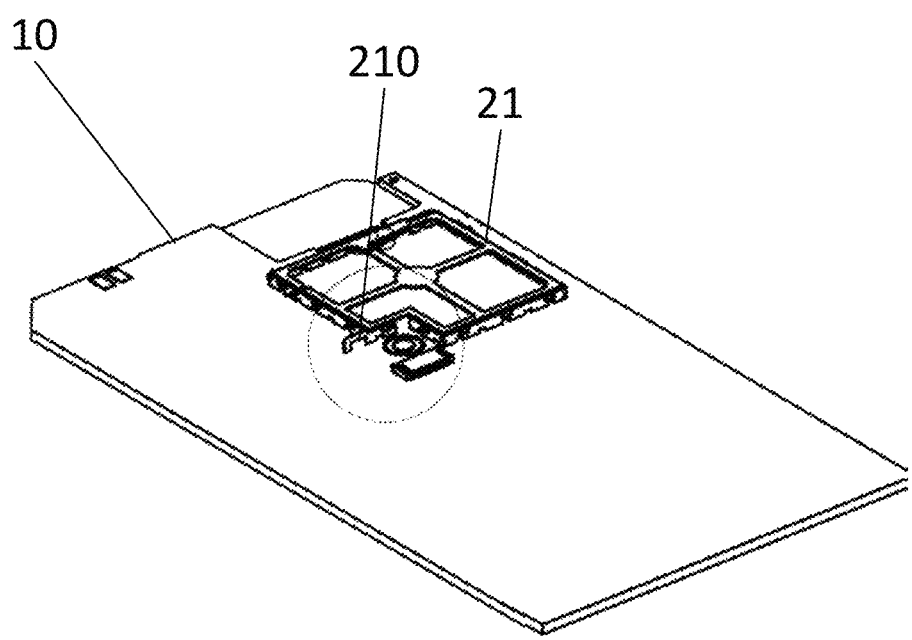
FIG. 5 is an isometric view of a motherboard and of the dummy key protected by the cylinder.

As explained in FIGS. 4 and 5 (re-using the numerical references used above), in this embodiment, the support part 23 has a generally rectangular parallelepiped shape. It comprises a front face (not shown) on which the screen is placed and a rear face (the face shown in FIG. 4). On this rear face, there is the toe 231 and the pressing cylinder 232 which is situated generally in a central position. The pressing cylinder 232 is more specifically surrounded by a set of protection walls (23p1, . . . 23p5, the other walls are not numbered), a clip (23a1) and other fastening elements. The protection walls are shaped so as to generally constitute a physical barrier for the components that are soldered to the motherboard to which the support part gets fitted. As a result, in addition to providing an optimized distribution of force, the support part acts a protection barrier for other electronic components. The support part 23 gets positioned above the shielding element 21 of the PCB 10 and the toe 231 takes position in the notch 210. The protection walls thus protect the electronic components situated on the PCB 10.

The exemplary embodiments explained here above are obviously given purely by way of an indication. Those skilled in the art are capable of understanding the advantages procured by the present technique, especially the advantages procured by the use of a support part comprising an attaching element. It is clear that such a support part can be used in other arrangements and other devices without departing from the framework of the present invention.

The invention claimed is:

1. A support part for supporting an LCD display module of an electronic device, which has a printed circuit board with a dummy key having a state activatable by an applied force, the support part comprising:
   at least one receiving element configured to receive a pressing device distinct from the support part and which is compressible to apply a pressing force on the dummy key; and
   at least one attaching element providing an attachment in a space between the support part and the PCB to secure said support part to the PCB of the electronic device such that the pressing device is compressed between said support part and said dummy key on the PCB.

2. The support part according to claim 1, wherein said receiving element is a cylinder capable of receiving a portion of said pressing device.

3. The support part according to claim 1, wherein said attaching element takes the form of a toe.

4. A system for securing an electronic device comprising:
   a support part for supporting an LCD display device; and a PCB comprising at least one dummy key having a state activatable by an applied force, said support part comprising at least one receiving element configured to receive a pressing device distinct from the support part and which is compressible to apply a pressing force on said dummy key, and said support part comprising an attaching element providing an attachment in a space between the support part and the PCB to secure said support part to the PCB such that the pressing device is compressed between said support part and said dummy key of the PCB.

5. The system for securing according to claim 4, wherein said receiving element is a cylinder, a portion of the pressing device being inserted into said cylinder.

6. The system for securing according to claim 4, wherein said attaching element takes the form of a toe.

7. The system for securing according to claim 6, further comprising a holding element soldered to said PCB board, said toe being inserted into a notch disposed in said holding element.

8. The system for securing according to claim 7, wherein said holding element forms part of an electromagnetic shielding element fixedly attached to said PCB.

9. An electronic device comprising:

a support part for supporting an LCD display device; and a PCB comprising at least one dummy key having a state activatable by an applied force, said support part comprising at least one receiving element configured to receive a pressing device distinct from the support part and which is compressible to apply a pressing force on said dummy key, and said support part comprising an attaching element providing an attachment in a space between the support part and the PCB to secure said support part to the PCB such that the pressing device is compressed between said support part and said dummy key of the PCB.

10. The electronic device according to claim 9, further comprising the LCD display device, wherein the attaching element attached to the PCB board generates a force FM that holds said support part attached to said PCB board, said pressing device exerting a force FD on the dummy key of the PCB board and a force FD' on the support part, said LCD display device exerting a force FC on said support part, the force FD being sufficient to activate the dummy key.

11. The electronic device according to claim 9, wherein the value of the force FM is equal to the value of the force FD'.

12. The electronic device according to claim 9, wherein the value of the force FD' is equal to the value of the sum of the force FM and the force FC, the value of the force FC being greater than zero.

13. The electronic device according to claim 9, further comprising a casing and the LCD display device, said LCD display device being disposed between an upper part of said casing and the support part.

14. The electronic device according to claim 9, wherein said electronic device is a payment terminal.

\* \* \* \* \*